Aug. 5, 1941.  E. C. STERLING  2,251,529
COMB FRAME LIFTING TONGS
Filed March 15, 1939
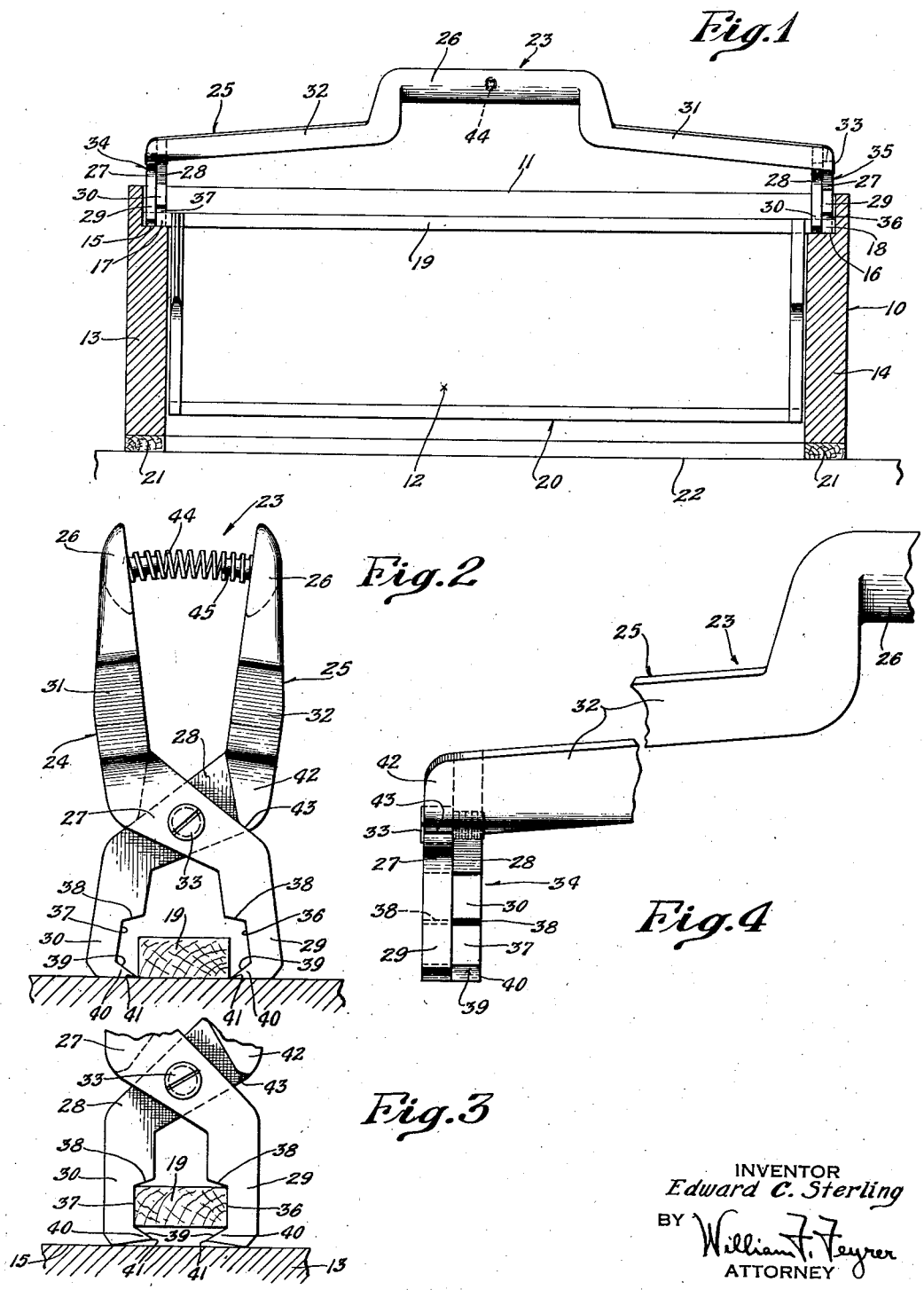
INVENTOR
Edward C. Sterling
BY William F. Feyrer
ATTORNEY Patented Aug. 5, 1941

2,251,529

UNITED STATES PATENT OFFICE 2,251,529

COMB FRAME LIFTING TONGS

Edward C. Sterling, Westport, Conn.

Application March 15, 1939, Serial No. 262,049

2 Claims. (Cl. 6—12)

This invention relates to a lifting implement and more particularly to an implement especially adapted to grip comb frames and lift the same out of a beehive body.

It is an object of the present invention to provide such an implement which may be most easily and economically produced and which will function in a particularly effective manner.

After a comb frame has been set in a hive body for sufficient time for the bees to fill the frame with honey, it frequently is found that a rather strong adhesion has been produced between the frame and the hive body. This renders it difficult to remove the frame.

Accordingly, it is an important object of the present invention to provide an implement which is adapted not only to lift a comb frame relative to a hive body, but also to mechanically pry the frame loose from the hive body.

A feature of the invention, therefore, resides in providing a pair of lifting tongs which is provided with means for wedging under a top bar of a comb frame and prying the same loose from the supporting shoulder in the hive body.

It is a further object of the invention to provide an implement which is adapted to securely hold a comb frame without marring or disfiguring the same in any way.

A feature of the invention resulting in the attainment of the above and other objects which will hereinafter appear, resides in providing a pair of lifting tongs in which a recess defined by a wedging surface at its lower side is provided in at least one of the gripping jaws for receiving a top bar of a comb frame.

Another feature of the invention resides in providing a pair of comb-frame lifting tongs having means for normally maintaining the gripping jaws in a predetermined open position whereby the tongs may be most easily manipulated to grip a comb frame.

Other objects and features will hereinafter appear.

In the drawing:

Figure 1 is a side view showing the implement in operative position with relation to a comb frame in a hive body.

Fig. 2 is an end view of the implement.

Fig. 3 is a fragmentary detail view showing the gripping jaws in a fully operative position.

Fig. 4 is an enlarged fragmentary side view of the implement.

Before describing the present improvements and mode of operation thereof in detail it should be understood that the invention is not limited to the details of construction and arrangement of parts shown in the accompanying drawing, which are merely illustrative of the present preferred embodiments, and the phraseology employed is for the purpose of description and not of limitation.

Referring more particularly to the drawing there is shown a beehive body 10 of conventional construction, having an open top 11, end walls 12, only one being shown, and side walls 13 and 14, the top edges of the side walls being rabbeted to provide shoulders 15 and 16 for supporting the projecting ends 17 and 18 of a top bar 19 of a conventional comb frame 20.

In use the hive body is placed on the usual side strips 21 on a base 22, and a plurality of empty comb frames 20 are suspended in rather closely spaced relation on the supporting shoulders 15 and 16. The open top 11 is then covered in the conventional manner.

After the comb frames have been filled with honey it is necessary to lift the individual frames from the hive. This operation if performed by hand is an awkward and many times difficult one, not only because of the closely spaced relation of the frames but also because of the fact that during the honey depositing period an adhesive bond is built up between the projecting ends of the top bar 19 and the rabbeted edges of the hive body. Moreover, a comb frame 20 when filled with honey is heavy and difficult to handle with the fingers.

It is to the end of obviating the aforementioned difficulties and at the same time providing a lifting implement 23 which may be most easily manipulated and which will securely grip a comb frame without marring or disfiguring the same, that the present invention is directed.

As shown, the lifting implement 23 involves two frames 24 and 25 which, as shown, may be of identical construction. Each frame includes a central hand grip 26 and laterally spaced depending lever sections 27 and 28, respectively terminating in gripping jaws 29 and 30 and connected to the hand grip 26 by laterally extending spacing sections 31 and 32.

In the assembly of the implement 23 the lever sections 27 and 28 on the respective frames are crossed and pivotally connected as by suitable pivot pins 33. In this manner laterally spaced pairs 34 and 35 of crossed and pivotally connected gripping members are provided, each pair including a lever section 27 and a gripping jaw 29 on one frame and a lever section 28 and gripping jaw 30 on the other frame.

Of importance the jaws 29 and 30 in each of the pairs 34 and 35 are provided with opposed recesses 36 and 37 defined on the upper sides by shoulders 38, and on the lower sides by inclined or wedging surfaces 39 on lifting fingers 40 extending inwardly from the lower end of each of the gripping jaws. Also, preferably and as shown the pairs 34 and 35 of gripping jaws are so spaced by the laterally extending sections 31 and 32 that they are adapted to grip the projecting ends 17 and 18 on a comb frame top bar 19.

With this construction when the implement is grasped by the hand grips 26 and inserted in a hive body, the points 41 on the lifting fingers 40 are located, as shown best in Fig. 2, to rest on the supporting shoulders 15 and 16 at opposite sides of the projecting ends on a selected top bar. Then, by squeezing the hand grips, the fingers 40 on opposed jaws 29 and 30 are drawn toward each other, forcing the wedging surfaces 39 under the projecting ends 17 and 18 to wedge the latter from the supporting shoulders 15 and 16 in the hive body and upwardly into the recesses 36 and 37 in opposed jaws 29 and 30 as shown best in Fig. 3. As also shown in Fig. 3, the engagement of the lower surfaces of the gripping jaws with the supporting shoulders 15 and 16, provides in effect a cam action which supplements the action of the wedging surfaces 39 in lifting the top bar 19 relative to the supporting shoulders.

The top bar 19 is thus securely gripped and confined in the opposed recesses 36 and 37 between the lifting fingers 40 and shoulders 38, and the comb frame may be easily lifted from the hive body. It is to be particularly noted that with the implement 23 provided by the present invention, a top bar may be securely gripped and held by the jaws 29 and 30 in the recesses 36 and 37 without marring or disfiguring the comb frame in any way, and that even though the top bar or any other part of the comb frame may be adhesively bound to the hive body, the wedging action of the lifting fingers will effectively pry the frame loose. This latter feature is very advantageous because the gradual but positive wedging action pulls the comb frame away from the hive body without any sudden adverse jerks or jars such as frequently occur when an attempt is made to lift a frame from a hive body merely with the hands.

In order that the implement 23 may be most easily manipulated, laterally extending abutments or stop shoulders 42 on lugs 43 are preferably provided on one of the lever sections 28 on each of the main frames 24 and 25, adapted to overlie and engage the other lever sections 27 when the gripping jaws have been spread to a predetermined open position sufficient to receive a top bar therebetween.

Also, preferably a spring 44 is provided for spreading and normally maintaining the jaws in this predetermined open position. As shown this spring may be conveniently mounted between the hand grips 26 and held in place by pins or lugs 45 extending from the respective grips 26 and into the ends of the spring.

A very fine control of the implement is thus made possible. Holding the grips in one hand, the implement may be positioned over a selected comb frame, the gripping jaws being held in a predetermined open position by the spring. Upon lowering the implement the lifting fingers are located at opposite sides of the projecting ends 17 and 18 of a top bar, and then by a simple squeeze on the grips, the lifting fingers are wedged under the top bar to lift the same into the recesses 36 and 37 where it is tightly held by the jaws.

Variations and modifications may be made within the scope of this invention and portions of the improvements may be used without others.

Having thus described the invention, what is claimed as new is:

1. Comb frame tongs comprising a pair of longitudinally extending handle bar members; spreading means normally to maintain the bar members outwardly; downwardly extending tong members at opposite ends of the bar members; the tong members of the respective bar members being pivoted to each other; each tong member having near its lower edge a hive contacting surface and a comb frame contacting surface; the hive contacting surfaces of opposite tongs being in alignment when the handle bars are in normally outwardly extended position and adapted to be inwardly and upwardly inclined when the bars are in comb frame gripping position; said tong members having abutting surfaces to limit the outward movement of the tongs to a position where the lower surfaces will be in alignment.

2. Comb frame tongs comprising a pair of longitudinally extending handle bar members; spreading means normally to maintain the bar members outwardly; downwardly extending tong members at opposite ends of the bar members; the tong members of the respective bar members being pivoted to each other; each tong member having near its lower edge a hive contacting surface and a comb frame contacting surface; the hive contacting surfaces of opposite tongs being in alignment when the handle bars are in normally outwardly extended position and adapted to be inwardly and upwardly inclined when the bars are in comb frame gripping position; said tong members having abutting surfaces to limit the outward movement of the tongs to a position where the lower surfaces will be in alignment; and walls above the hive contacting surfaces so constructed and arranged that when the tongs grip, said walls will be parallel and abut the comb frame.

EDWARD C. STERLING.